United States Patent
Signorelli et al.

(10) Patent No.: US 8,847,600 B2
(45) Date of Patent: Sep. 30, 2014

(54) USE OF AUTOTRANSFORMER-LIKE ANTENNAS FOR DOWNHOLE APPLICATIONS

(75) Inventors: Jack Signorelli, Cypress, TX (US); Samuel R. Bell, Tomball, TX (US); Stanislav W. Forgang, Houston, TX (US); Sheng Fang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 848 days.

(21) Appl. No.: 13/035,098

(22) Filed: Feb. 25, 2011

(65) Prior Publication Data

US 2012/0051189 A1    Mar. 1, 2012

Related U.S. Application Data

(60) Provisional application No. 61/309,515, filed on Mar. 2, 2010.

(51) Int. Cl.
*G01V 3/00* (2006.01)
*G01V 3/12* (2006.01)
*G01V 3/30* (2006.01)
*G01V 3/28* (2006.01)

(52) U.S. Cl.
CPC .. *G01V 3/12* (2013.01); *G01V 3/30* (2013.01); *G01V 3/28* (2013.01)
USPC ........... 324/338; 324/200; 324/219; 324/240; 324/333; 324/346; 324/351; 324/355; 324/366; 324/368

(58) Field of Classification Search
CPC ............. G01V 3/28; G01V 3/26; G01V 3/12; G01V 3/18; G01V 1/44; G01V 1/52; G01V 2210/6226; G01V 2210/626; G01V 11/002; E21B 47/00; H01F 13/006
USPC ......... 324/200, 219, 240, 228, 239, 333, 338, 324/346, 351, 355, 366, 368
See application file for complete search history.

(56) References Cited

U.S. PATENT DOCUMENTS 3,612,877 A * 10/1971 Hopkinson .................. 250/261
4,785,247 A * 11/1988 Meador et al. ............... 324/338
(Continued)

FOREIGN PATENT DOCUMENTS

JP         10243253 A      5/2006

OTHER PUBLICATIONS

Notification of Transmittal of the International Search Report and the Written Opinion of the International Searching Authority, or the Declaration; PCT/US2011/026679; Oct. 31, 2011.

(Continued)

*Primary Examiner* — Patrick Assouad
*Assistant Examiner* — Sean Curtis
(74) *Attorney, Agent, or Firm* — Cantor Colburn LLP

(57) ABSTRACT

An apparatus for estimating a property of an earth formation penetrated by a borehole, apparatus including: a carrier configured to be conveyed through the borehole; a transducer disposed at the carrier and configured to transmit and/or receive electromagnetic energy into and/or from the earth formation to estimate the property; wherein the transducer includes a plurality of inductively coupled elements in a series, each element configured to transmit and/or receive electromagnetic energy and at least a first connection to a first element in the plurality and a second connection to a second element in the plurality with at least one of the first element and the second element being disposed between end transducer elements in the series.

20 Claims, 5 Drawing Sheets

(56) References Cited

U.S. PATENT DOCUMENTS

| | | | |
|---|---|---|---|
| 4,825,184 A | 4/1989 | Bloch et al. | |
| 5,065,099 A * | 11/1991 | Sinclair et al. | 324/339 |
| 5,309,120 A * | 5/1994 | Koontz | 333/32 |
| 6,163,155 A * | 12/2000 | Bittar | 324/338 |
| 6,891,376 B2 * | 5/2005 | Hanstein et al. | 324/333 |
| 7,038,455 B2 | 5/2006 | Beste et al. | |
| 7,388,379 B2 * | 6/2008 | Moore | 324/338 |
| 2005/0001623 A1 * | 1/2005 | Hanstein et al. | 324/336 |
| 2008/0258733 A1 * | 10/2008 | Bittar | 324/333 |
| 2009/0091327 A1 * | 4/2009 | Blanz | 324/333 |
| 2009/0301781 A1 * | 12/2009 | Fang et al. | 175/50 |
| 2010/0123462 A1 * | 5/2010 | Bittar | 324/369 |

OTHER PUBLICATIONS

ARRL Handbook. For Radio Communications, The comprehensive RF Engineering Reference 2010, the Biggest Handbook Ever!. Electrical Fundamentals pp. 2.65.

\* cited by examiner

V(26 to 25) = (N/n) V(24 to 23)

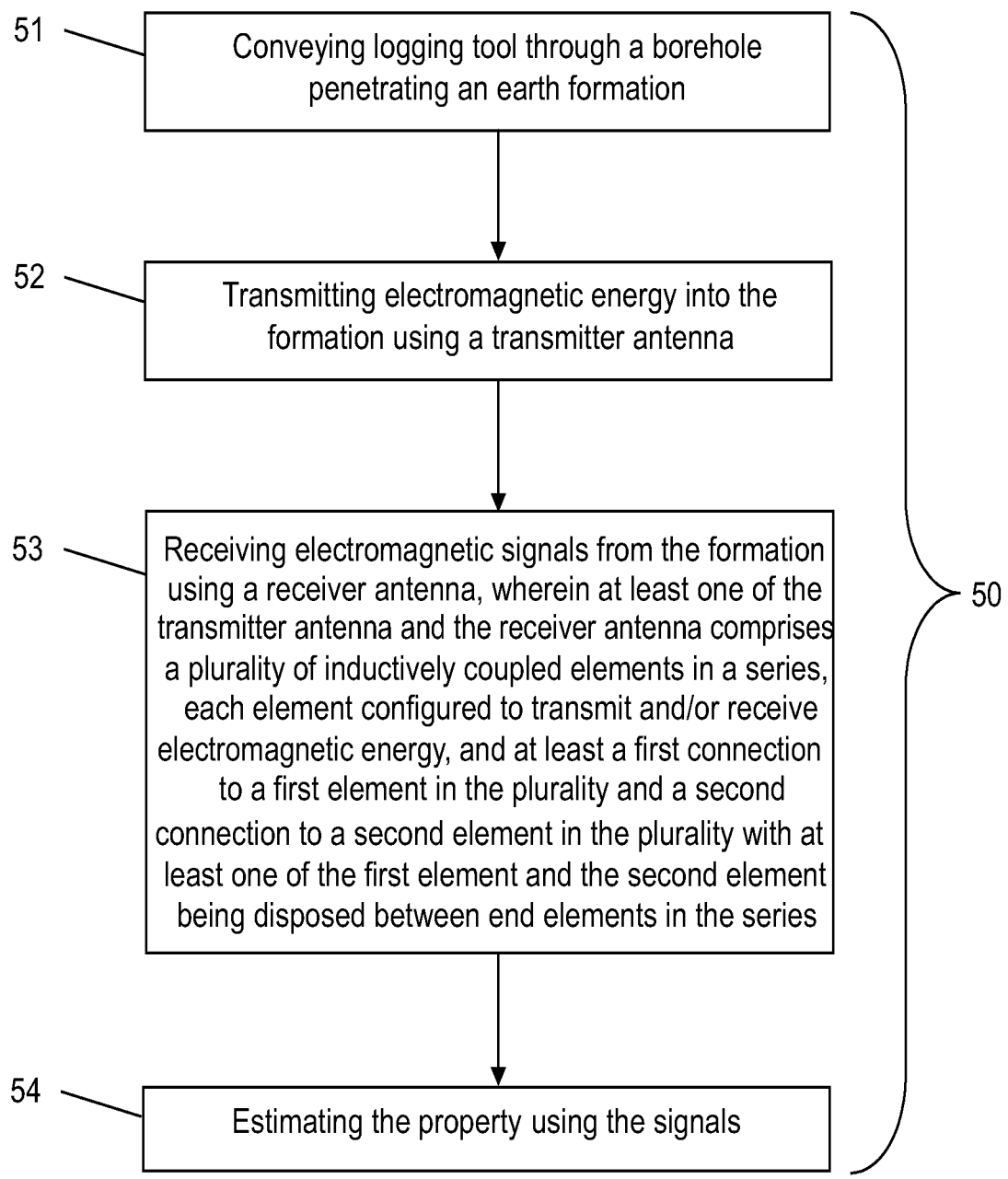

USE OF AUTOTRANSFORMER-LIKE ANTENNAS FOR DOWNHOLE APPLICATIONS

BACKGROUND OF THE INVENTION

1. Field of the Invention

The present invention relates to the analysis of an underground earth formation and, more particularly, to transmitting and receiving signals to and from the formation to estimate the resistivity of the formation.

2. Description of the Related Art

Exploration and production of hydrocarbons requires accurate and reliable measurements of a geologic formation, which may contain a reservoir of the hydrocarbons. In general, a borehole is drilled into the earth to gain access to the formation to perform the measurements. Measurements performed in the borehole are generally referred to as well logging.

In one embodiment of well logging referred to as logging-while-drilling or measurement-while-drilling, a logging instrument or tool is disposed at a bottom hole assembly at the distal end of a drill string. As the drill string rotates to drill the borehole, the logging tool performs the measurements. The measurements are generally logged with a depth at which they were performed. Together, the measurements and associated depths create a well log. The well log may be presented graphically or as an image.

One type of downhole measurement is of electrical properties of the earth formation. The electrical properties provide information about the geologic materials that make up the formations, and about their likely oil, gas and water content.

The electrical properties of the earth formation may be measured by an induction well logging technique. In induction well logging, a transmitter emits electromagnetic energy into the formation. The changing magnetic fields associated with the energy induce alternating circulating currents in the formation. The alternating circulating currents in turn emit electromagnetic energy that is received by a receiver via an antenna. Characteristics of the received electromagnetic energy are then related to the electrical properties of the formation.

In conventional well logging tools, the antenna may be tuned to specific frequencies. This tuning produces resonant frequencies with high Q for optimal performance. In general, the antenna is tuned using fixed value components such as resistors, capacitors and inductors. For protection, these components are usually mounted in a junction box or located under a protective sleeve at or near the receiving antenna. Because of the limited space available in a while-drilling tool due to the requirement of having drilling mud flow through the center of the drill string and the tool, the junction box may be mounted in a cut-out of a steel structure of the tool.

Unfortunately, in the conventional induction logging tool, the cut-out can increase the chances of corrosion and cracking in the tool structure and, thus, the reliability of the tool. Another drawback is that the additional separate tuning circuitry adds more components to increase the chance of failure and, thus, increased time and cost required for maintenance in a maintenance shop.

Therefore, what are needed are techniques to increase the reliability and performance of induction well logging tools.

BRIEF SUMMARY OF THE INVENTION

Disclosed is an apparatus for estimating a property of an earth formation penetrated by a borehole, apparatus includes: a carrier configured to be conveyed through the borehole; a transducer disposed at the carrier and configured to transmit and/or receive electromagnetic energy into and/or from the earth formation to estimate the property; wherein the transducer comprises a plurality of inductively coupled elements in a series, each element configured to transmit and/or receive electromagnetic energy and at least a first connection to a first element in the plurality and a second connection to a second element in the plurality with at least one of the first element and the second element being disposed between end transducer elements in the series.

Also disclosed is one example of a method for estimating a property of an earth formation penetrated by a borehole, the method including: conveying a carrier through the borehole; and transmitting and/or receiving electromagnetic energy with a transducer disposed at the carrier, the electromagnetic energy being used to estimate the property; wherein the transducer includes a plurality of inductively coupled elements in a series, each element configured to transmit and/or receive electromagnetic energy and at least a first connection to a first element in the plurality and a second connection to a second element in the plurality with at least one of the first element and the second element being disposed between end transducer elements in the series.

Further disclosed is an apparatus for estimating a property of an earth formation penetrated by a borehole, the apparatus including: a carrier configured to be conveyed through the borehole; a transmitter disposed at the carrier and coupled to a first transducer configured to transmit electromagnetic energy into the earth formation; and a receiver disposed at the carrier and coupled to a second transducer configured to receive electromagnetic signals from the earth formation due to an interaction of the transmitted electromagnetic energy with the earth formation; wherein the electromagnetic signals are used to estimate the property and at least one of the first transducer and the second transducer includes a plurality of inductively coupled elements in a series, each element configured to transmit and/or receive electromagnetic energy, and at least a first connection to a first element in the plurality and a second connection to a second element in the plurality with at least one of the first element and the second element being disposed between end transducer elements in the series.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 5 presents one example of a method for estimating a property of the earth formation.

DETAILED DESCRIPTION OF THE INVENTION

Disclosed are exemplary embodiments of techniques for estimating an electrical characteristic of an earth formation penetrated by a borehole. An example of the electrical characteristic is resistivity or conductivity, which is the inverse of resistivity. The techniques, which include apparatus and method, call for using an induction logging tool to measure the electrical characteristic.

The induction logging instrument is configured to transmit an electromagnetic (EM) signal (i.e., energy) into the earth formation where the EM signal induces eddy currents to flow in response to a current flow through a transmitter coil. An in-phase component of an EM signal generated in a receiver coil in response to presence of eddy currents is measured. Variations in the magnitude of the eddy currents in response to variations in the formation conductivity are reflected as variations in the received EM signal. Thus, the magnitude of the in-phase component of the received signal is indicative of the conductivity of the formation. The transmitter coil and receiver coil may also be referred to herein as an antenna or transducer.

In order to achieve an efficient transmission of the transmitted EM signal and a high signal to noise ratio in the received EM signal, the techniques call for the transmitter antenna and the receiver antenna to use an antenna that functions similarly to an autotransformer having a primary side with n turns and a secondary side with N turns. The coils in the autotransformer act as antenna elements. Because the antenna acts as an autotransformer, the losses in a cable coupling a transmitter to the autotransformer-like antenna are attenuated as the turns ratio squared (i.e., (n/N)**2).

In addition, the techniques call for coupling a tuning circuit to the secondary side of the autotransformer-like antenna. The tuning circuit can tune the impedance of the autotransformer-like antenna to a specific frequency or frequencies associated with performing the induction logging measurements. The tuned impedance of the inductance of the antenna plus the impedance of a cable coupling the secondary side to the tuning circuit increases as the inverse of the turns ratio squared (i.e., (N/n)**2), thus, impedance matching can be achieved.

Figure 1:
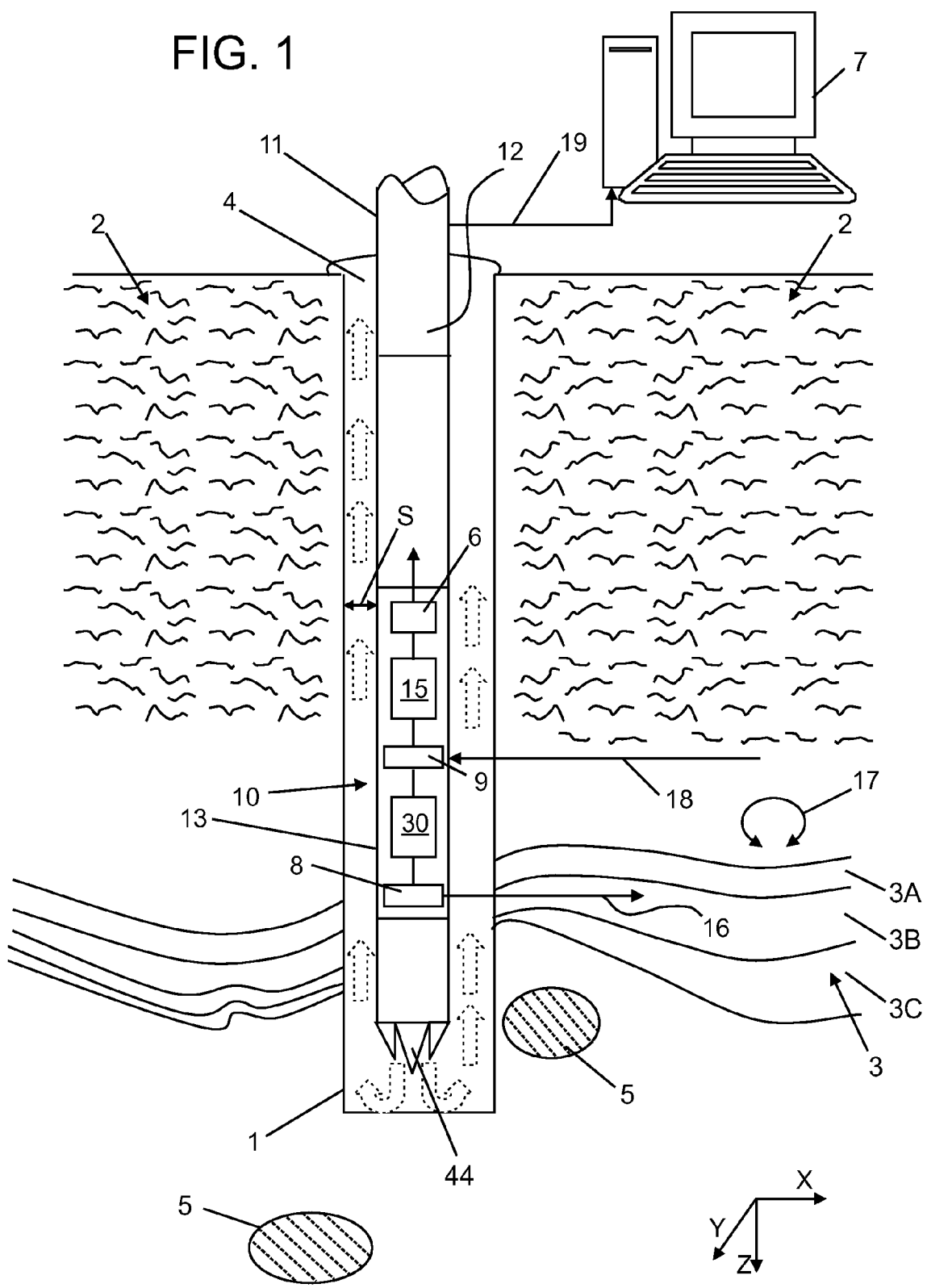
FIG. 1 illustrates an exemplary embodiment of an induction logging tool disposed in a borehole penetrating the earth.

Reference may now be had to FIG. 1 illustrating an exemplary embodiment of an induction logging tool 10 disposed in a wellbore 1 (also referred to as a borehole). As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by drilling rig components (not shown) which, among other things, provides rotational energy and downward force. The wellbore 1 generally traverses sub-surface materials, which may include a formation 3 (shown with layers 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formation 3 is formed of sub-surface materials. Accordingly, as used herein, it should be considered that while the term "formation" generally refers to geologic formations and "sub-surface material," which includes any materials, and may include materials such as fluids, gases, liquids, and the like.

The drill string 11 includes lengths of drill pipe 12 which drive a drill bit 44. In this example, the drill bit 44 also provides a flow of a drilling fluid 4, such as drilling mud. The drilling fluid 4 is often pumped to the drill bit 44 through the drill pipe 12, where the fluid exits into the wellbore 1. This results in an upward flow of drilling fluid 4 within the wellbore 1. The upward flow generally cools the drill string 11 and components thereof, carries away cuttings from the drill bit 44 and prevents blowout of pressurized hydrocarbons 5.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD), or "logging while drilling" (LWD). Performing MWD or LWD generally calls for operation of the logging instrument (or tool) 10 that is incorporated into the drill string 11 and designed for operation while drilling or during a temporary halt in drilling. The logging tool 10 includes a mandrel 13 for supporting components of the tool 10. The mandrel 13 is hollow in the center for allowing the drilling fluid 4 to pass through to the drill bit 44. Generally, the MWD logging instrument 10 is coupled to an electronics package, which is also on board the drill string 11, and therefore referred to as "downhole electronics 6." Generally, the downhole electronics 6 provides for at least one of operational control and data analysis. Often, the MWD logging instrument 10 and the downhole electronics 6 are coupled to a surface processing system 7. The surface processing system 7 may be included to further control operations, provide greater analysis capabilities as well as data logging and the like. A communications channel (not shown) may provide for communicating data 19 between the downhole electronics 6 and the surface processing system 7, and may operate via pulsed mud, wired pipe, and other technologies as are known in the art.

Still referring to FIG. 1, the logging tool 10 includes a transmitter antenna 8 coupled to a transmitter 30, which may be included in the downhole electronics 6 or as a separate device. The transmitter 30 and the transmitter antenna 8 are configured to transmit electromagnetic energy 16 at a specific frequency into the formation 3. The electromagnetic energy 16 induces circulating currents 17, which may also be referred to as eddy currents, in the formation 3. The circulating currents 17 in turn emit electromagnetic signals 18 at or near the specific frequency of the electromagnetic energy 16. The electromagnetic signals 18 are received by a receiver antenna 9 at the logging tool 10. The electromagnetic signals 18 have characteristics that are related to a property of the formation 3. The property may be resistivity or its inverse conductivity. The property may also be a location of a boundary between layers of the formation 3.

Still referring to FIG. 1, the receiver antenna 9 is coupled to a receiver 15. As shown in FIG. 1, the receiver 15 is coupled to the downhole electronics 6 for operation and/or communication purposes.

While the embodiment of FIG. 1 illustrates one transmitter antenna 8 and one receiver antenna 9, more than one of each antenna and associated components may be included in the induction logging tool 10. When two or more receiver antennas 9 are used, amplitude and/or phase differences between the electromagnetic signals received by the receiver antennas 9 may be measured and related to a property of the formation 3. Alternatively, one autotransformer-like antenna may be used to both transmit and receive the electromagnetic signals.

Figure 2:
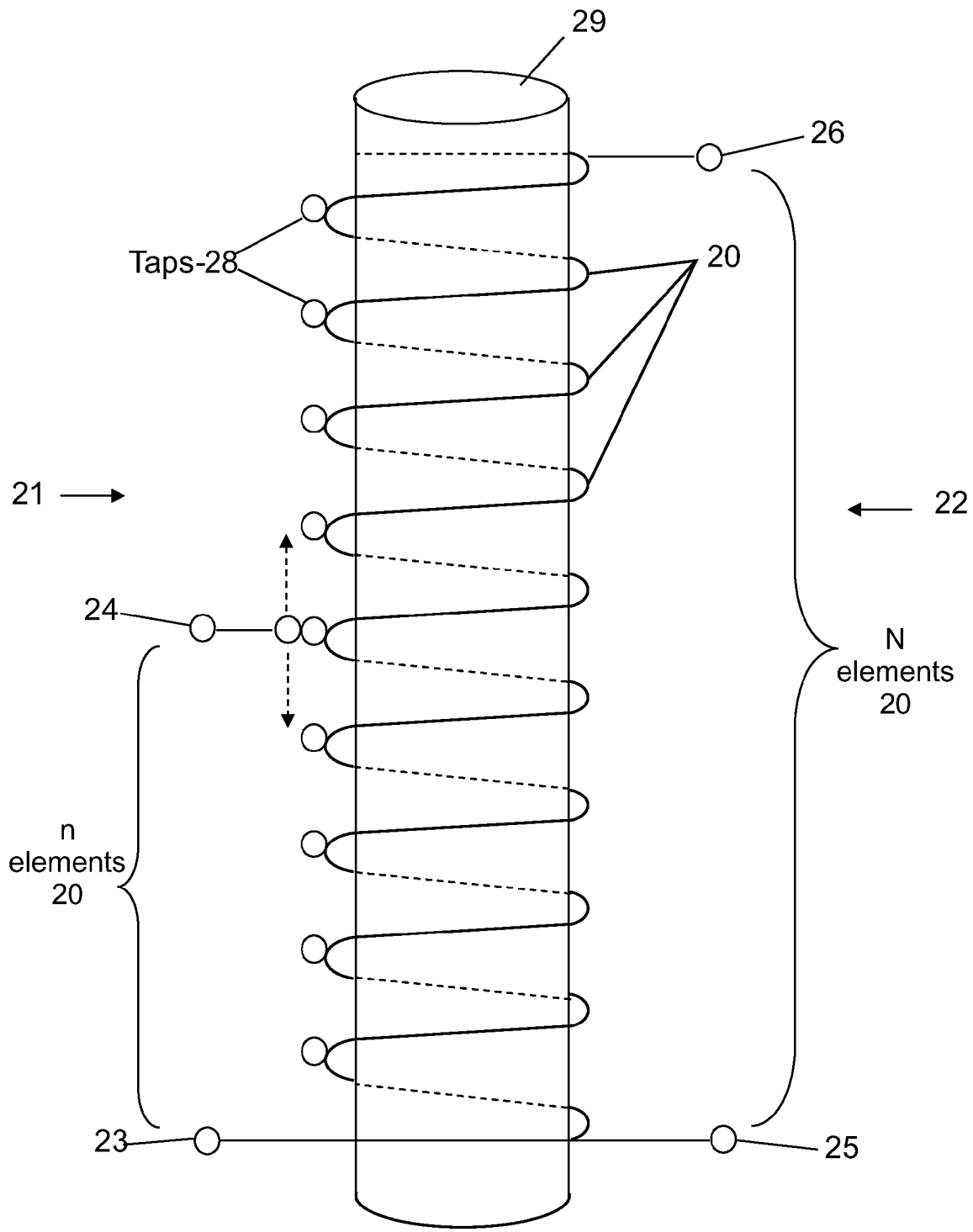
FIG. 2 depicts aspects of an auto or multi-tap transformer used as an antenna disposed at the logging tool.

Reference may now be had to FIG. 2 depicting aspects of the transmitter antenna 8 and the receiver antenna 9 configured as the autotransformer-like antenna. The antenna 8, 9 includes a series of inductively coupled windings that form coils 20, also referred to as transducer elements 20. Each transducer element 20 is configured to transmit and/or receive EM energy or signals. The transducer elements 20 are coupled together in series and surround a core 29. The core 29 is configured to couple a magnetic field (or magnetic flux) generated by one element 20 to an adjacent element 20 in order for the antenna 8,9 to act as an autotransformer. One exemplary embodiment of a material for the core 29 is ferrite. The core 21 can be continuous as shown in FIG. 2 or the core 29 can be made of core element segments with a space between the core element segments. In one embodiment, each discrete core element segment is disposed under and/or over a conductor coil defining a plane perpendicular to the segments.

Still referring to FIG. 2, the antenna 8, 9 includes a first side 21 (or primary side 21) and a second side (or secondary side 22). The term "side" relates to a configuration of connections to the elements 20 and not necessarily to physical sides. The first side 21 includes a first connection 23 and a second connection 24. The second connection 24 in FIG. 2 is configured as a changeable connection that can change connection from one element 20 to another element 20. In one embodiment, the changeable connection 24 can connect to any fixed tap 28 in a plurality of fixed taps 28 where each tap 28 connects to a specific transducer element 20. In another embodiment, the changeable connection 24 is configured to continuously slide along the transducer elements 20 to connect with a specific transducer element 20. Hence, the input inductance to the antenna 8, 9 can be selected. In addition, a turns ratio and, thus, signal amplification from the first side 21 to the second side 22 can also be selected.

In one embodiment, the changeable connection may be coupled to an operator mechanism configured to remotely change the changeable connection 24 to another element 20 to achieve a desired response characteristic of the antenna 8, 9.

Still referring to FIG. 2, the second side 22 includes a third connection 25 and a fourth connection 26. The third connection 25 and the fourth connection 26 in the embodiment of FIG. 2 are fixed connections connecting to the two end elements 20 in the series of elements 20.

While the embodiment of FIG. 2 illustrates three fixed connections and one changeable connection, it is recognized that any combination of fixed and/or changeable connections may be had.

Figure 3:
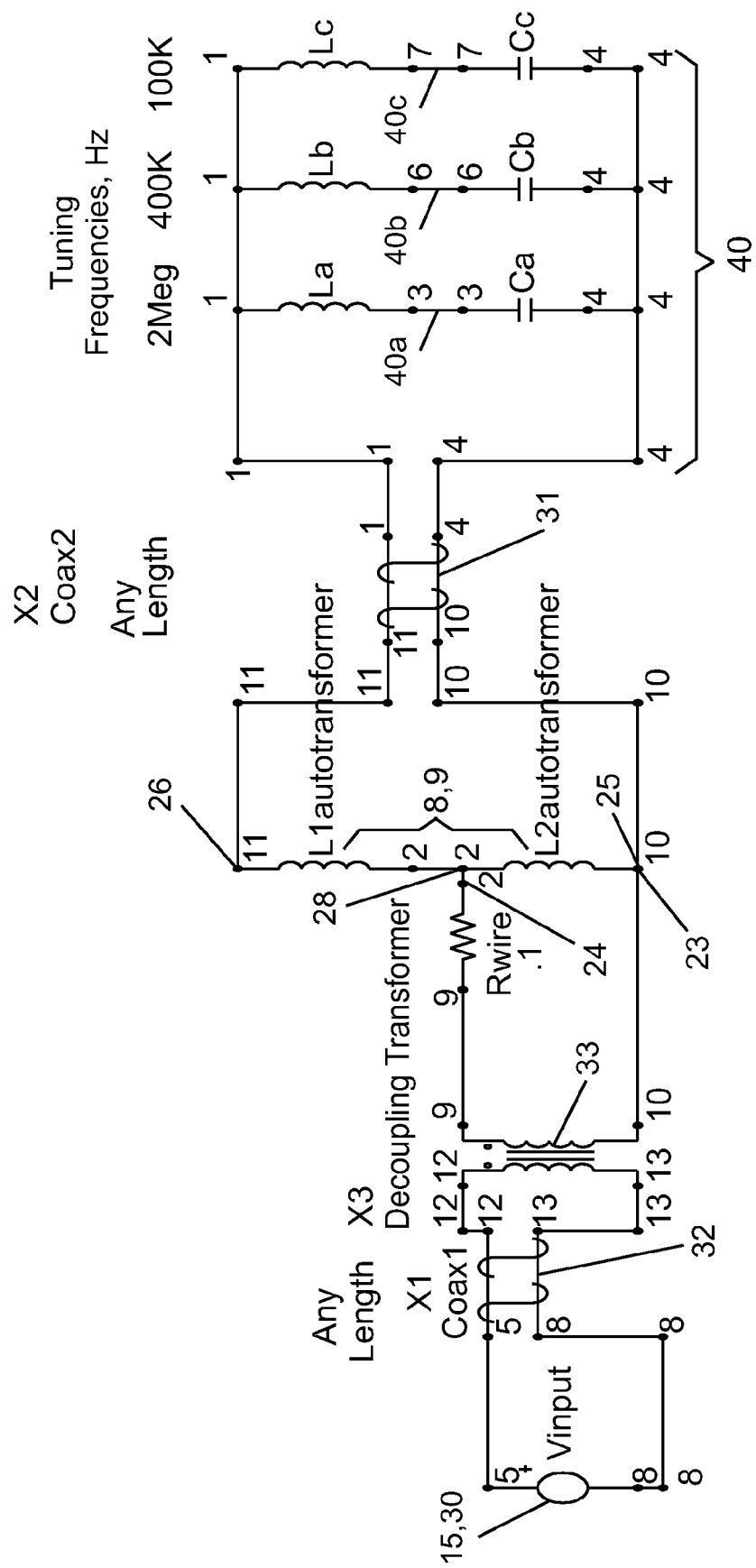
FIG. 3 depicts aspects of the antenna coupled to a tuning circuit.

Reference may now be had to FIG. 3 depicting aspects of the antenna 8, 9 coupled to a tuning circuit 40 by way of a coaxial cable 31, which is a non-limiting embodiment of a connecting cable. The transmitter 30 and/or the receiver 15 are coupled to the primary side 21 of the antenna 8, 9 by way of a coaxial cable 32, which is a non-limiting embodiment, and a decoupling transformer 33. The decoupling transformer 33 isolates the transmitter 30/receiver 15 from the antenna 8,9 to prevent the transmission of a direct current (DC) signal. The coaxial cables 31 and 32 can represent any type of connecting cable.

Still referring to FIG. 3, the tuning circuit 40 includes three sub-tuning circuits (40a, 40b, and 40c) that are configured to resonate at three different frequencies such as 2 MHz, 400 KHz and 100 KHz as non-limiting examples. In the embodiment of FIG. 3, each sub-tuning circuit includes an inductor in series with a capacitor.

Figure 4:
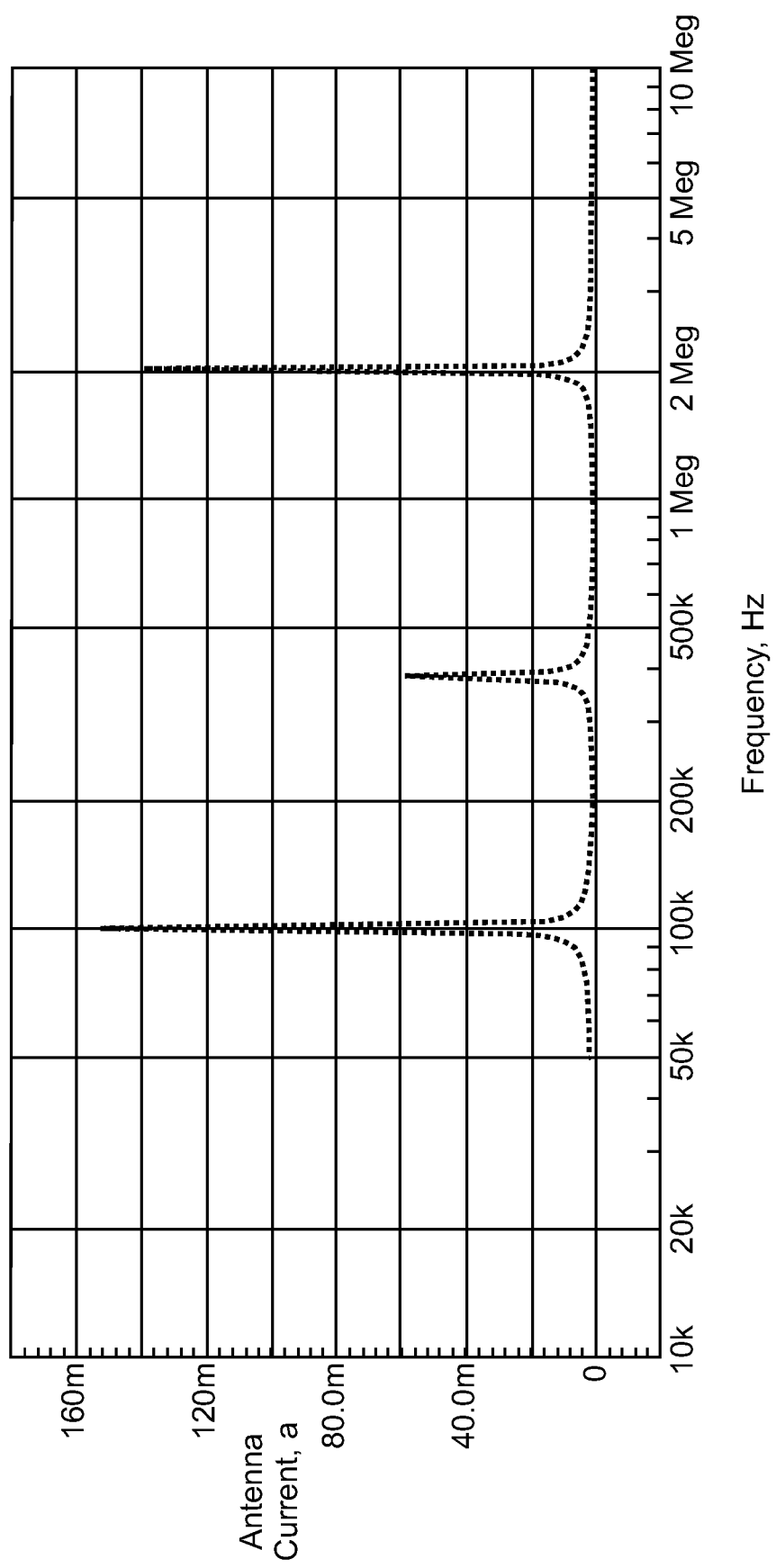
FIG. 4 depicts an example of a response of the antenna coupled to the tuning circuit.

An analysis of the antenna 8, 9 coupled to the tuning circuit 40 can be performed by solving loop equations or by other methods known in the art. FIG. 4 shows the results of analysis of current flowing in the antenna 8, 9. The analysis demonstrates that the antenna 8, 9 is sensitive to the non-limiting frequencies. In particular, the antenna 8, 9 has a high quality (Q) factor at 2 MHz, 400 KHz and 100 KHz where Q=center frequency/operating frequency band. The high Q of the antenna 8, 9 provides for increased signal output when used as the transmitter antenna 8 and higher signal to noise ratio when used as the receiver antenna 9. The term "tuning" as used herein relates to providing circuitry that causes the Q of the antenna 8, 9 to increase at one or more selected frequencies.

In the embodiment of FIG. 3, the tuning circuit 40 includes the three sub-tuning circuits 40a, 40b and 40c with fixed-value components. In another embodiment, the tuning circuit 40 can be configured to switch in and out sub-tuning circuits related to specific resonant frequencies. In another embodiment, the tuning circuit 40 can be configured to adjust components having variable values to achieve a specific resonant frequency. In another embodiment, the coaxial cable 31 may have an inherent capacitance that will cause the antenna 8, 9 to tune to a selected frequency without the tuning circuit 40, or the coaxial cable 31 may be coupled to a capacitor to provide more capacitance as required for tuning to the selected frequency.

A tuning circuit in prior art tools is placed close to the associated antenna to eliminate any adverse effects of a cable coupling the tuning circuit to the antenna. However, placing the tuning circuit close to the antenna requires a cut-out in a mandrel next to another cut-cut that may be required for the antenna. Two or more cut-outs close to each other can weaken the mandrel and create corrosion and stress opportunities. One advantage of the antenna 8,9 over the antennas in prior art tools is that the tuning circuit 40 can be disposed away from the antenna 8,9 such as at the receiver 15 and/or the transmitter 30, thus, eliminating the need for multiple close-together cut-outs in the mandrel 13. Eliminating cut-outs results in a stronger more robust tool 10 requiring less maintenance time and cost.

Reference may now be had to FIG. 5 presenting a method 50 for estimating a property of the earth formation 3. The method 50 calls for (step 51) conveying the induction logging tool 10 through the borehole 1. Further, the method 50 calls for (step 52) transmitting electromagnetic energy into the formation 3 using the transmitter antenna 8. Further, the method 50 calls for (step 53) receiving electromagnetic signals from the formation 3 using the receiver antenna 9. Further, the method 50 calls for (step 54) estimating the property using the signals.

In support of the teachings herein, various analysis components may be used, including a digital and/or an analog system. For example, the downhole electronics 6 or the surface processing system 7 may include the analog or digital system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second," "third" and "fourth" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, apparatus comprising:
    a carrier configured to be conveyed through the borehole;
    a transducer disposed at the carrier and configured to transmit and/or receive electromagnetic energy into and/or from the earth formation to estimate the property;
    wherein: the transducer comprises a plurality of inductively coupled elements in a series, each element configured to transmit and/or receive electromagnetic energy, and at least a first connection to a first element in the plurality and a second connection to a second element in the plurality with at least one of the first element and the second element being disposed between end transducer elements in the series;
    each element in the plurality of inductively coupled elements is electrically connected to an adjacent element; and
    the second connection is configured as a changeable connection that is configured to couple to fixed taps or to slide continuously the elements or a combination thereof.

2. The apparatus of claim 1, wherein the transducer further comprises a third connection to a third element in the plurality and a fourth connection to a fourth element in the plurality and the apparatus further comprises a tuning circuit coupled to the third and fourth connections, the tuning circuit being configured to tune the transducer to at least one resonant frequency.

3. The apparatus of claim 2, further comprising a cable coupling the transducer to the tuning circuit wherein the tuning circuit is disposed at a transmitter or a receiver or a combination thereof.

4. The apparatus of claim 2, wherein the tuning circuit is configured to tune to a plurality of fixed resonant frequencies.

5. The apparatus of claim 4, wherein the tuning circuit is configured to be switched to one resonant frequency in the plurality of resonant frequencies.

6. The apparatus of claim 2, wherein the first element and the third element are the same end element in the series and the fourth element is another end element in the series.

7. The apparatus of claim 1, wherein each element in the plurality comprises a coil.

8. The apparatus of claim 7, wherein a material is disposed adjacent to each coil, the material being configured to couple a magnetic field generated by one coil to an adjacent coil.

9. The apparatus of claim 8, wherein the material is ferromagnetic.

10. The apparatus of claim 1, wherein the property is resistivity or conductivity or a combination thereof.

11. The apparatus of claim 1, wherein the carrier is configured to be conveyed by a drillstring or coiled tubing.

12. A method for estimating a property of an earth formation penetrated by a borehole, the method comprising:
    conveying a carrier through the borehole; and
    transmitting and/or receiving electromagnetic energy with a transducer disposed at the carrier, the electromagnetic energy being used to estimate the property;
    wherein: the transducer comprises a plurality of inductively coupled elements in a series, each element configured to transmit and/or receive electromagnetic energy and at least a first connection to a first element in the plurality and a second connection to a second element in the plurality with at least one of the first element and the second element being disposed between end transducer elements in the series;
    each element in the plurality of inductively coupled elements is electrically connected to an adjacent element; and
    the second connection is configured as a changeable connection that is configured to couple to fixed taps or to slide continuously along the elements or a combination thereof and the method further comprises selecting one element in the plurality for coupling to the second connection.

13. The method of claim 12, wherein the transducer further comprises a third connection to a third element in the plurality and a fourth connection to a fourth element in the plurality and a tuning circuit is coupled to the third and fourth connections, the tuning circuit comprising components to tune the transducer to at least one resonant frequency and the method further comprises switching components in the tuning circuit to achieve a selected resonant frequency.

14. An apparatus for estimating a property of an earth formation penetrated by a borehole, the apparatus comprising:
    a carrier configured to be conveyed through the borehole;
    a transmitter disposed at the carrier and coupled to a first transducer configured to transmit electromagnetic energy into the earth formation; and
    a receiver disposed at the carrier and coupled to a second transducer configured to receive electromagnetic signals from the earth formation due to an interaction of the transmitted electromagnetic energy with the earth formation;

wherein: the electromagnetic signals are used to estimate the property and at least one of the first transducer and the second transducer comprises a plurality of inductively coupled elements in a series, each element configured to transmit and/or receive electromagnetic energy, and at least a first connection to a first element in the plurality and a second connection to a second element in the plurality with at least one of the first element and the second element being disposed between end transducer elements in the series;

each element in the plurality of inductively coupled elements is electrically connected to an adjacent element; and the second connection is configured as a changeable connection that is configured to couple to fixed taps or to slide continuously along the elements or a combination thereof.

15. The apparatus of claim 14, wherein a magnetic field generated by one element in the plurality is coupled to an adjacent element in the plurality.

16. The apparatus of claim 14, further comprising a tuning circuit coupled to the at least one of the first transducer and the second transducer comprising the plurality of inductively coupled elements and configured to tune the transducer to at least one resonant frequency.

17. The apparatus of claim 16, wherein the tuning circuit is disposed at the transmitter or the receiver or a combination thereof.

18. The apparatus of claim 1, wherein the plurality of inductively coupled elements in a series comprises a series of windings surrounding a core configured to couple a magnetic field generated by one element to an adjacent element.

19. The method of claim 12, wherein the plurality of inductively coupled elements in a series comprises a series of windings surrounding a core configured to couple a magnetic field generated by one element to an adjacent element.

20. The apparatus of claim 14, wherein the plurality of inductively coupled elements in a series comprises a series of windings surrounding a core configured to couple a magnetic field generated by one element to an adjacent element.

* * * * *